United States Patent [19]

Jacobs

[11] Patent Number: 5,526,410
[45] Date of Patent: Jun. 11, 1996

[54] METHOD AND SYSTEM FOR DETERMINATION OF SIGNAL/NOISE RATIO OF TELEPHONE TRANSMISSION LINE USED FOR FACSIMILE TRANSMISSION

[75] Inventor: Henry W. Jacobs, Austin, Tex.

[73] Assignee: Texas Instruments Incorporated, Dallas, Tex.

[21] Appl. No.: 371,945

[22] Filed: Jan. 12, 1995

[51] Int. Cl.⁶ .................................................. H04M 11/00
[52] U.S. Cl. .............................. 379/100; 379/93; 379/98
[58] Field of Search ................................. 379/1, 4, 5, 6, 379/24, 28, 93, 94, 97, 98, 100; 375/222, 350; 455/67.3; 358/463, 280

[56] References Cited

U.S. PATENT DOCUMENTS

| | | | |
|---|---|---|---|
| 3,394,222 | 7/1968 | Townsend | 358/463 |
| 3,814,868 | 6/1974 | Bradley | 379/6 |
| 4,630,126 | 12/1986 | Kaku et al. | 358/280 |
| 5,166,954 | 11/1992 | Grizmala et al. | 379/6 |
| 5,299,257 | 3/1994 | Fuller et al. | 379/93 |

*Primary Examiner*—Jason Chan
*Attorney, Agent, or Firm*—Robert L. Troike; Leo N. Heiting; Richard L. Donaldson

[57] ABSTRACT

The signal to noise ratio of a telephone transmission line used for facsimile is determined in one preferred embodiment by notch filtering the received CED signal at the calling unit. The total CED signal received representing signal plus noise (S+N) is processed with the filtered CED signal representing noise N according to 20·log ([(S+N)−N]/N).

18 Claims, 3 Drawing Sheets

METHOD AND SYSTEM FOR DETERMINATION OF SIGNAL/NOISE RATIO OF TELEPHONE TRANSMISSION LINE USED FOR FACSIMILE TRANSMISSION

TECHNICAL FIELD OF THE INVENTION

This invention relates to facsimile systems and more particularly to a method and/or system to determine signal to noise ratio of a telephone transmission line sending and/or receiving facsimile messages.

BACKGROUND OF THE INVENTION

Good copy quality of facsimile sent messages is dependent on signal to noise ratio of the telephone line. The speed of transmission is slowed down or stopped if the line is too noisy. Knowledge of the signal to noise ratio is critical and the earlier this is known, the earlier appropriate action can be taken and this can result in time savings of several seconds on every call.

SUMMARY OF THE INVENTION

In accordance with one embodiment of the present invention, a method for early determination of the signal to noise ratio in a telephone line between two facsimile units is achieved by detecting the received signal and a tone signal sent by one of the facsimile units.

These and other features of the invention that will be apparent to those skilled in the art from the following detailed description of the invention, taken together with the accompanying drawings.

DETAILED DESCRIPTION OF THE INVENTION

Description of Preferred Embodiments

Figure 1:
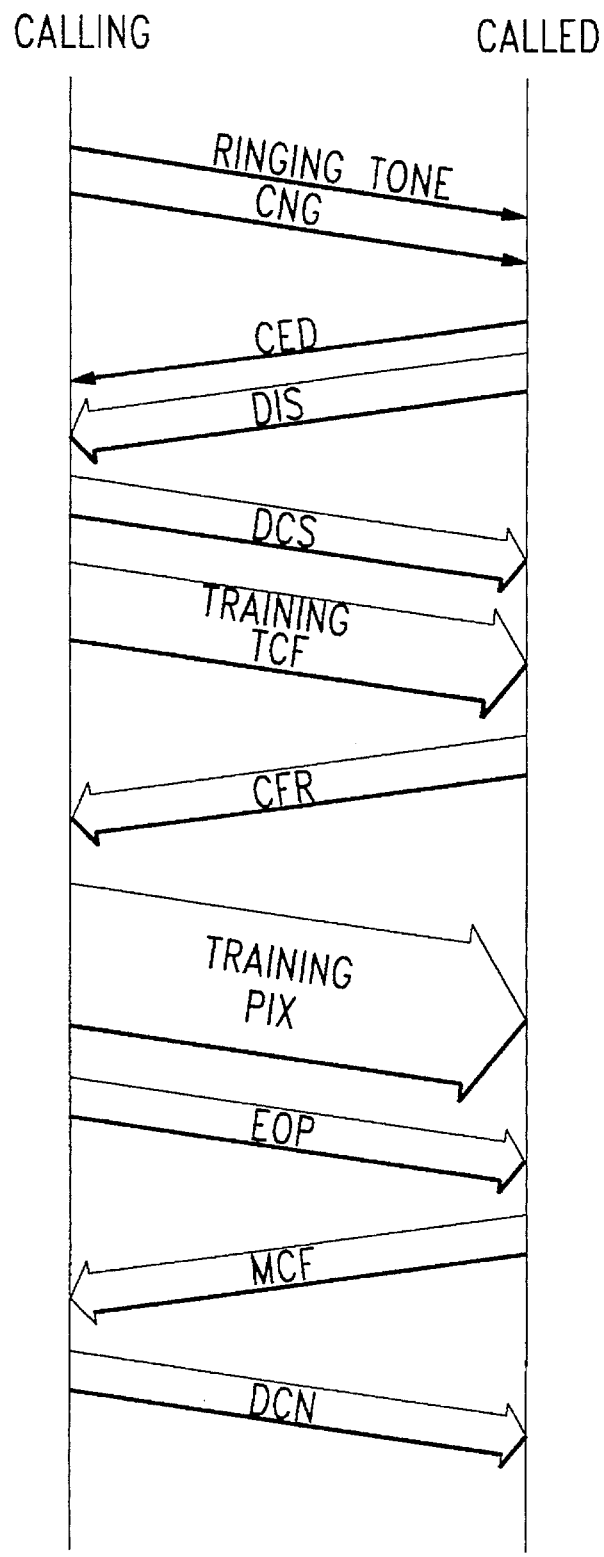
FIG. 1 is a diagram of the protocol for Group 3 facsimile.

Referring to FIG. 1, there is illustrated the protocol for Group 3. This is part of the CCITT Recommendation T.30, Procedures for Document Facsimile Transmission in General Switch Telephone Network. Making a facsimile call and sending a document is divided into five time phases for a one-page transmission. The first, Phase A, is call set up. The second, Phase B, is premessage procedure. The third, Phase C, is fax message transmission. The fourth, Phase D, is post message procedure. The fifth, Phase E, is call release. See Protocol section pages 40–52 in "Fax: Digital Facsimile Technology & Applications" by Kenneth R. McConnell, Dennis Bodson and Richard Schaphorst, published 1989 by Artech House, Inc., 685 Cantor Street, Norwood, Mass. 02062 (International Standard Book No. 0-89006-310-9, Library of Congress Catalog Card No. 89-6602).

In the calling step (Phase A), the calling fax unit dials the number of the receiving unit and the called fax unit automatically answers a ring signal sent by the telephone company with the line connection. The calling fax unit sends a CNG signal of 1100 Hz which tone is on for one half of a second and off for three seconds. The called (receiving) unit sends a 2100 Hz tone (CED) back to the calling fax unit for three seconds, followed by a short burst of 300 b/s DIS (digital identification signal). See FIG. 1. When the person making the call hears this signal, he or she presses a button and connects the fax unit to the telephone line.

The calling fax unit decodes the burst of DIS that identifies the capabilities of the called fax unit. The calling fax unit sends a burst of DCS signal to select the compatible feature to be used for the call. After the DCS signal is a training signal for the receiving modem and a 1.5 second TCF signal of all 0's to check the modem is receiving error-free bits. If these are correct, a CFR signal is sent from the receiving fax to the calling fax. The calling fax then sends a short modem training signal followed by fax signals. At the end of fax signals for one page an EOP (end of fax procedure) signal is sent. The fax receiver sends MCF to indicate the page has been received correctly. The fax transmitter unit notes the "OK" in its log and sends DCN and both fax units disconnect.

In accordance with one preferred embodiment of the present invention, the signal to noise ratio for a fax transmission is determined using the CED signal sent by the fax unit that will receive the fax data. The CED signal is the 2100 Hz tone (+/−15 Hz) that is sent for a duration of not less than 2.6 seconds and not more than 4.0 seconds at 1.8 to 2.5 seconds after the called station is connected to the line. The signal to noise ratio in this preferred embodiment is calculated by determining 1) the total energy being received, and 2) the energy remaining after the input signal is filtered by a notch filter centered at 2100 Hz.

The total energy received is composed of both the noise (denoted by N), and the energy in the CED signal (denoted by S). Thus, the total energy is represented by S+N. The energy remaining after the notch filter is the noise (N). The signal to noise ratio (SN) is determined for example by:

$$SN = 20 \cdot \log\left[(S+N)-N\right]/N$$

With the assumption that the noise is the same in both directions, the signal to noise ratio seen at the receiving fax unit is the same.

Once the signal to noise ratio is determined, the system can be adjusted to improve the likelihood that the receiving device receives a good fax by raising, when needed, the transmitted signal level. This improves the signal to noise ratio by making the signal level higher. The signal to noise ratio may also be used to decide not to transmit the fax or to send it at a lower speed, prior to doing the high speed training and transmission of the TCF. This would result in a time savings of several seconds, which would be significant when sending thousands of faxes.

Figure 2:
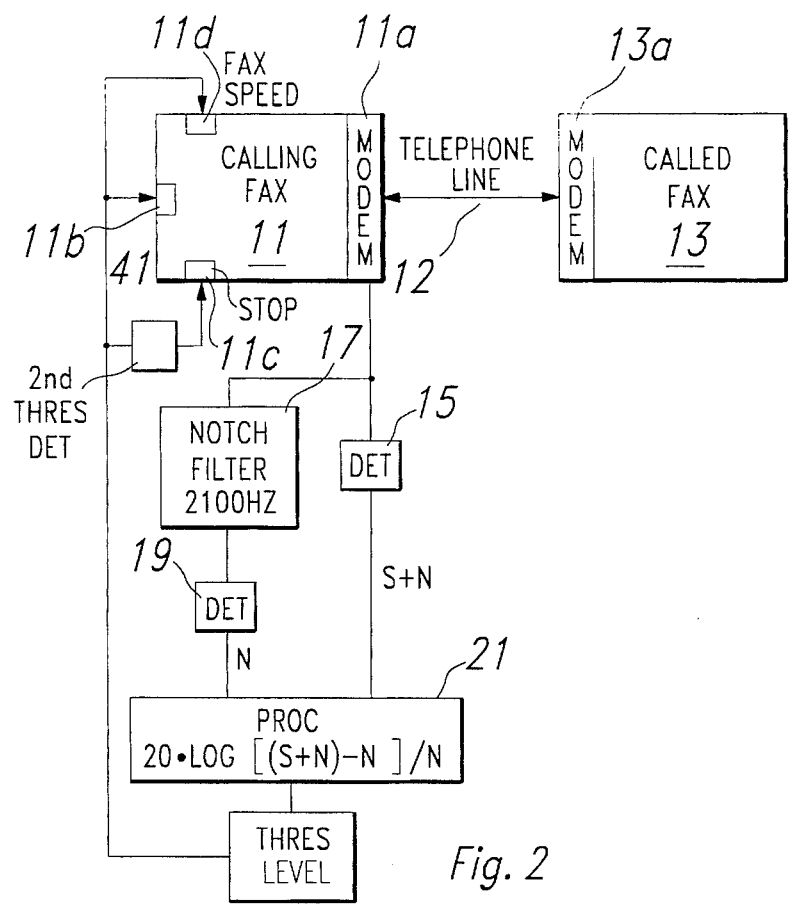
FIG. 2 is a block diagram of the system according to one preferred embodiment of the present invention using 2100 Hz notch filter.

The system may be like FIG. 2 with a calling fax unit 11 and a called fax unit 13. The calling fax unit 11 includes a modem 11a and the called fax unit 13 includes a modem 13a. The calling fax unit includes a detector 15 coupled to the modem 11a for detecting the total energy received (S+N). The output from the modem 11a may be passed through 2100 Hz notch filter 17 and then detected at detector 19. The detector 19 output level value representing noise (N) and the signal plus noise (S+N) output level at the output of the detector 15 are applied to calculator or processor 21. The calculated output value calculated according to the above equation represents the signal to noise ratio of the calling telephone line 12 between the fax units 11 and 13. The calling fax unit 11 may detect if the SN level is below a certain threshold to raise the transmitted signal level of the transmitted (calling) fax at amplitude control 11b or to cancel transmission of the fax at 11c (if beyond second threshold level at T) or to send the fax at a slower speed.

Figure 3:
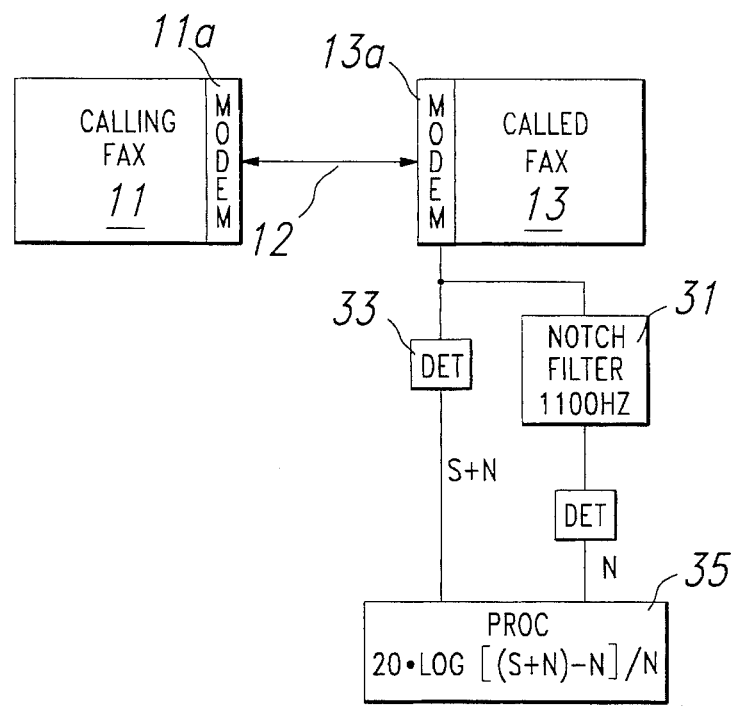
FIG. 3 is a block diagram of another embodiment of the invention using 1100 Hz notch filter.

The signal to noise ratio for a fax reception could also be measured by the same technique using the received CNG signal as shown in FIG. 3. This is a 1100 Hz (+/−38 Hz) signal that is sent for a duration of 0.5 seconds every three seconds until the calling station or unit 11 detects a signal from the called station 13. In practice, the receiving or called station would have a notch filter 31 at 1100 Hz in place of the 2100 and a detector 32 and the called station 13 could also detect the total energy signal at detector 33 and calculate at processor 35 at the called station 13. Since the called station has no way to change the transmit level, it may be noted or recorded for future use.

Figure 4:
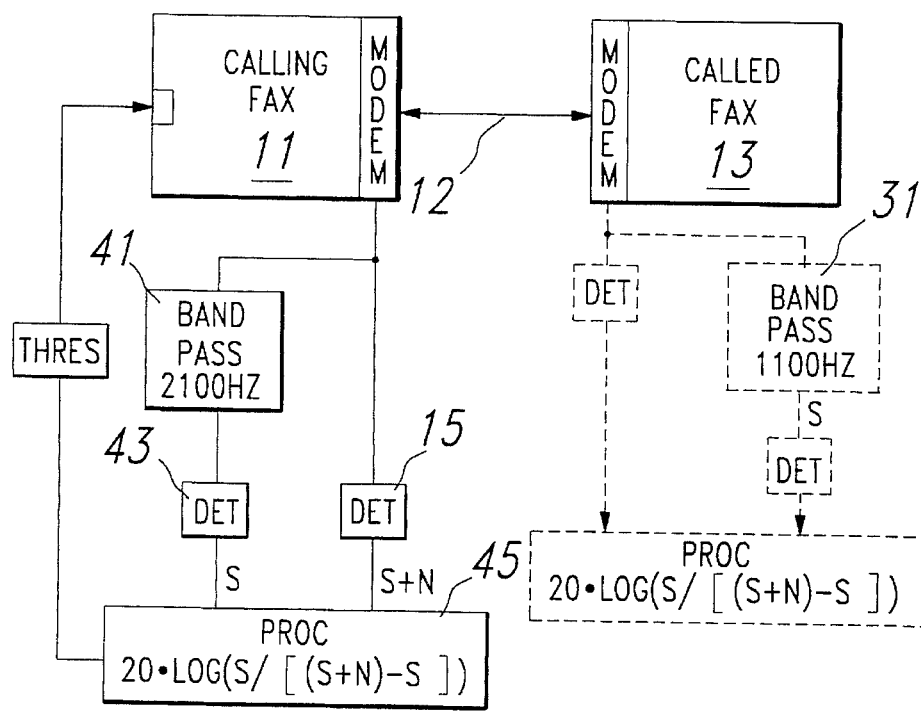
FIG. 4 is a block diagram of another embodiment using band pass filtering.

An alternate technique is to pass the input signal through a band pass filter at the appropriate frequency (2100 Hz for CED or 1100 for CNG) and measure the energy of the signal or S. The S+N is detected at detector 15 without any filtering. Referring to FIG. 4, there is illustrated a band pass filter 41 for passing and detecting the 2100 Hz tone. The S+N is detected at detector 15 and the output from band pass filter 41 for 2100 Hz is detected at detector 43. The detected output at detectors 15 and 43 is processed in processor 45 according to for example 20·log (S/[S+N]−S]) to get the signal to noise ratio. The threshold from that is used to adjust the transmitted level, to change the speed or to stop the transmission. For the case of using 1100 Hz signal, this is represented by the dashed lines.

Figure 5:
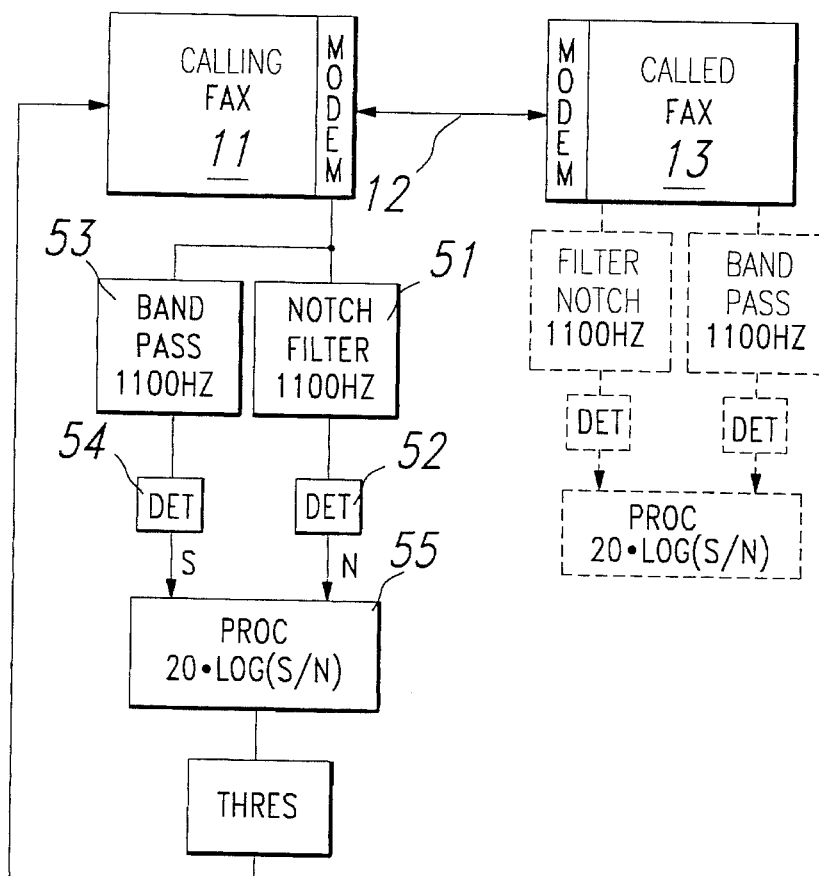
FIG. 5 is a block diagram of still another embodiment using notch filtering and band pass filtering.

In still another embodiment, the signal to noise ratio could be calculated by using a combination of band pass and notch filters and using for example equasion for db of SN=20·log (S/N) as shown in FIG. 5. For the 2100 Hz case, the notch filter 51 and detector 52 detect the noise level N and the band pass filter 53 centered at 2100 Hz and detector 54 detect the signal level S. From this is calculated at processor 55 the signal to noise level using, for example, 20·log (S/N). This is again thresholded and used to control fax unit 11. The dashed lines in FIG. 5 represent determining the signal to noise using the 1100 Hz tone. The use of the 20 log (S/N) is for measurement in decibels (db) and is only by way of example. It is understood that any other calculation methods based on S and N to get S/N in the embodiments shown and described may be used.

Other Embodiments

Although the present invention and its advantages have been described in detail, it should be understood that various changes, substitutions and alterations can be made herein without departing from the spirit and scope of the invention as defined by the appended claims.

What is claimed is:

1. A method for determining signal to noise ratio of a telephone transmission line used for facsimile transmission between facsimile units without demodulation of a transmitted signal comprising the steps of:

detecting a received facsimile signal level at one of the facsimile units connected by said transmission line without demodulation to provide a first signal representing a first signal level;

filtering a single transmitted facsimile tone transmitted in a call setup phase over said transmission line to provide a filtered tone;

detecting a signal level of the filtered tone without demodulation to provide a second signal representing a second signal level; and processing said first and second signals to provide a third signal representing said signal to noise ratio.

2. A method of determining signal to noise ratio of a telephone transmission line coupled to between a calling facsimile unit and called facsimile unit without demodulating a transmitted signal comprising the steps of:

at the calling unit notch filtering a received CED tone to provide a filtered CED tone and detecting a first signal level of aid notch filtered CED tone to provide a first signal representing noise at said first signal level;

at the calling unit detecting a total signal level of the received CED tone to provide a second signal representing signal plus noise level of the called unit; and processing said first and second signals to provide a third signal representing signal to noise ratio in said line.

3. The method of claim 2 further including the step of controlling the calling unit in response to said third signal.

4. The method of claim 3 wherein said third signal controls transmit signal level of the calling unit.

5. The method of claim 3 wherein said third signal controls the transmission speed of the calling facsimile unit.

6. The method of claim 3 wherein said third signal level controls stopping the transmission of any facsimile.

7. A method of determining signal to noise ratio of a telephone transmission line coupled to between a calling facsimile unit and called facsimile unit comprising the steps of:

at the called unit notch filtering a received CNG signal and detecting a notch filtered CNG signal level to provide a first signal representing noise;

at the called unit detecting a total signal plus noise level of the received CNG signal without filtering to provide a second signal representing signal plus noise level of the called unit; and processing said first and second signals to provide a third signal representing signal to noise ratio in said line.

8. A method of determining signal to noise ratio of a telephone transmission line coupled to between a calling facsimile unit and called facsimile unit comprising the steps of:

at the calling unit band pass filtering a received CED signal at 2100 Hz and detecting a signal level of said CED signal to provide a first signal representing signal S;

at the calling unit detecting a total signal level of the received CED signal to provide a second signal representing signal plus noise level S+N of the called unit; and processing said first and second signals according to S/[(S+N)−S] to provide a third signal representing signal to noise ratio in said line.

9. The method of claim 8 wherein said third signal controls transmit signal level of the calling unit.

10. The method of claim 8 wherein said third signal controls the transmission speed of the calling facsimile unit.

11. The method of claim 8 wherein said third signal controls stopping the transmission of any facsimile.

12. A method of determining signal to noise ratio of a telephone transmission line coupled to between a calling facsimile unit and called facsimile unit comprising the steps of:

at the called unit band pass filtering a received CNG signal and detecting a CNG signal level of the band pass filtered CNG signal to provide a first signal representing signal S;

at the called unit detecting a total signal level of the received CNG signal without filtering to provide a second signal representing signal plus noise level S+N of the called unit; and processing said first and second signals according to S/[(S+N)−S] to provide a third signal representing signal to noise ratio in said line.

13. A method of determining signal to noise ratio of a telephone transmission line coupled to between a calling facsimile unit and called facsimile unit comprising the steps of:

at the calling unit band pass filtering a received CED signal and detecting a CED signal level of the band pass filtered CED signal to provide a first signal representing signal S;

at the calling unit notch filtering said CED signal and detecting a signal level of a notch filtered CED signal to provide a second signal representing noise level N at the called unit; and processing said first and second signals to provide a third signal S/N representing signal to noise ratio in said line.

14. The method of claim 13 further including the step of controlling the calling unit in response to said third signal.

15. The method of claim 13 wherein said third signal controls transmit signal level of the calling unit.

16. The method of claim 13 wherein said third signal controls the transmission speed of the calling facsimile unit.

17. The method of claim 13 wherein said third signal controls stopping the transmission of any facsimile.

18. A method of determining signal to noise ratio of a telephone transmission line coupled between a calling facsimile unit and called facsimile unit comprising the steps of:

at the called unit band pass filtering a received CNG signal and detecting a CNG signal level of said filtered CNG signal to provide a first signal representing signal S;

at the called unit notch filtering said CNG signal and detecting a signal level of a notch filtered CNG signal to provide a second signal representing noise level N at the called unit; and processing said first and second signals to provide a third signal S/N representing signal to noise ratio in said line.

* * * * *